July 8, 1924.
F. S. STRENG
TRANSMISSION GEARING
Filed Aug. 31, 1922
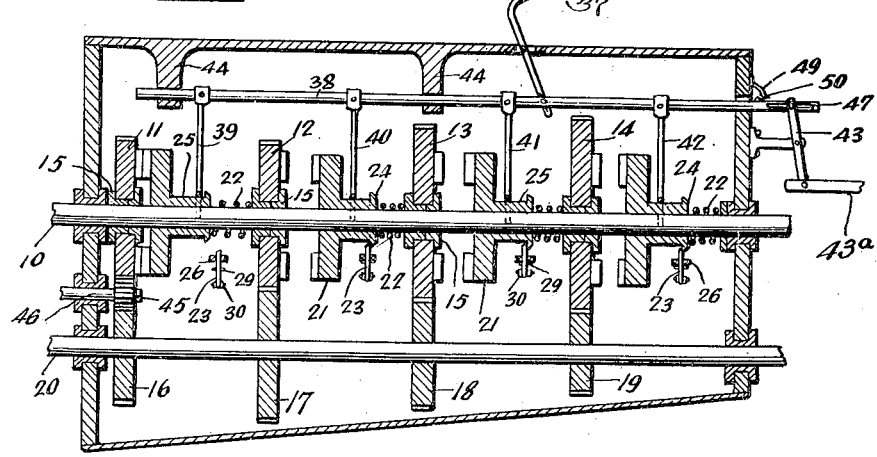
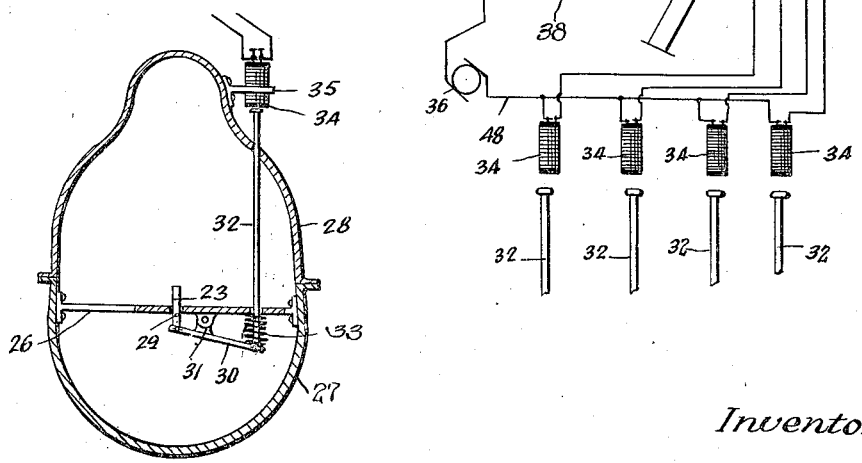
Inventor.
Frank S. Streng.

Patented July 8, 1924.

1,500,965

UNITED STATES PATENT OFFICE.

FRANK S. STRENG, OF STRATTONVILLE, PENNSYLVANIA.

TRANSMISSION GEARING.

Application filed August 31, 1922. Serial No. 585,544.

*To all whom it may concern:*

Be it known that I, FRANK S. STRENG, a citizen of the United States, residing at Strattonville, in the county of Clarion and State of Pennsylvania, have invented new and useful Improvements in Transmission Gearing, of which the following is a specification.

This invention relates to improvements in variable speed transmission mechanisms and is especially adapted for use in motor driven vehicles.

An object of the present invention is the provision of a transmission mechanism wherein the various speed change gears are always in mesh and are capable of being selectively locked upon their shaft, means being provided whereby, when one gear is locked, the gear locking means will be rendered inoperative so that the parts must assume a neutral position before another change can be made.

With the above and other objects in view, the invention further includes the following novel features and details of construction, to be hereinafter more fully described, illustrated in the accompanying drawings and pointed out in the appended claims.

In the drawings:—

Figure 1 is a sectional view illustrating a transmission mechanism constructed in accordance with the invention.

Figure 2 is a transverse section through the housing with parts of the mechanism removed.

Figure 3 is a diagram illustrating the electrically operated means for selectively controlling the speed changes.

Referring in detail to the drawings wherein like characters of reference denote corresponding parts, the mechanism which constitutes the present invention is contained within a housing which includes a lower section 27 and an upper section 28, the sections being suitably secured together.

Extending longitudinally through the housing and mounted within suitable bearings is a drive shaft 10 which may be operatively connected with a motor or other source of power and which has secured thereon collars 15. These collars are provided with annular grooves and form bearings for gears 11, 12, 13 and 14 which are capable of free rotation within these grooves.

Also mounted in suitable bearings within the housing is a driven shaft 20 and fast upon this shaft are gears 16, 17, 18 and 19, the three last mentioned gears being in mesh with the gears 12, 13 and 14 respectively. The gears 11 and 16 are operatively connected by an idler pinion 45 which is mounted upon a shaft 46.

Mounted for sliding movement upon the shaft 10 are clutch members 21 which are adapted to engage clutch faces provided upon the gears 11, 12, 13 and 14. Extending from the clutch members 21 are sleeves 25 which are provided with annular flanges 24, while springs 22 which are interposed between the ends of these sleeves and the collars 15 exert pressure to force the clutch members 21 into engagement with the clutch faces of the gears.

In order to hold the clutch members in disengaged position there is provided a plurality of dogs 23 which extend upward through guide openings provided in transversely arranged bars 26, upward movement of the dogs 23 being limited by stop pins 29. Pivotally secured to the lower ends of the dogs 23 are arms 30 which are pivotally connected to the bars 26 as shown at 31. The opposite ends of the arms 30 have pivotally secured thereto rods 32 which extend through guide openings provided in the bars 26 and which have mounted thereon springs 33 which act to normally force the dogs 23 upward into position to engage the flanges of the sleeves 25.

The rods 32 extend upward through the housing and have mounted thereon heads which provide armatures. These armatures are normally spaced from the electro magnets 34 which are carried by bracket arms 35 extending from the housing. The magnets 34 are electrically connected to a generator 36 or other source of current and are included in circuits with a switch having independently operated switch elements, H, I, L, and R, the latter being mounted upon the steering post of an automobile or at other convenient point.

Extending through the housing is a longitudinally movable shifting rod 38 which is mounted in bearings 44, while extending from this rod 38 are arms 39, 40, 41 and 42. The lower or free ends of these arms carry yokes which engage over the sleeves 25 of the clutch members so as to engage the flanges 24. Extending through the upper part of the housing is a pivotally mounted foot lever 37 whose inner end is pivotally connected to the rod 38, while the latter extends through one end of the housing and has a slidingly pivotal connection as at 47 with the lever 43, the latter being in turn connected to the brake rod 43ª of an automobile.

The rod 38 carries a contact 50 which is adapted to engage a contact 49 carried by the housing.

In the operation of the invention assuming that the mechanism is in neutral and it is desired to engage the reversing gears 11 and 16 so as to rotate the shaft 20, the switch element R is depressed so as to energize one of the magnets 34 and attract its armature. The rod of this armature will then be moved longitudinally upward so as to withdraw the dog 23 which engages the flange of the clutch member 21 of the gear 11. The spring 22 will then force this clutch member to engage the clutch face of the gear 11 and lock the latter to the shaft 10. The movement of this clutch lever will move the shifting rod 38 longitudinally toward the left of Figure 1 and will disengage the contact 50 from the contact 49 so as to prevent the completion of a circuit through any of the electro magnets 34. When it is desired to return the parts to normal position, the foot lever 37 is depressed to move the rod 38 in a reverse direction so that the clutch member will be disengaged from the clutch face of the gear 11 and moved against the tension of its spring 22 depressing the dog 23 against the spring 33. After the flange 24 has passed the dog 23, the latter will move inward or toward the shaft 10 to engage upon the inner face of the flange and hold the clutch member against movement by the spring. The contact 50 will now be in position to engage the contact 49 so that any of the switch elements may be depressed to selectively energize any of the magnets 34.

By further depressing the foot lever 37, the brake rod 43ª will be actuated through the operation of the lever 43 so as to apply the vehicle brakes.

The invention is susceptible of various changes in its form, proportions and minor details of construction and the right is herein reserved to make such changes as properly fall within the scope of the appended claims.

Having described the invention what is claimed is:—

1. In a variable speed transmission mechanism, a drive shaft, gears mounted for rotation thereon, a driven shaft, gears fast upon the driven shaft and engaging the gears upon the drive shaft, spring actuated clutches mounted upon the drive shaft for locking the gears thereto, spring actuated means for holding the clutches in neutral position, electrically operated means for selectively releasing any of the clutch holding means, means including a shifting rod common to all of the clutches for returning them to normal position and means included in the electrically operated means and controlled by the operation of the shifting rod to render the releasing means inoperative when any one of the clutches is in engaged position.

2. In a variable speed transmission mechanism, a drive shaft, gears mounted for rotation thereon, a driven shaft, gears fast upon the driven shaft and engaging the gears upon the drive shaft, spring actuated clutches mounted upon the drive shaft for locking the gears thereto, a flanged collar carried by each clutch, dogs movable radially with respect to and engaging the flanges of the collars to hold the clutches in neutral position, means whereby the dogs may be selectively moved to permit of the engagement of the clutches, a shifting rod, arms carried by the shifting rod and engaging the clutch collars and means whereby the shifting rod may be operated to cause the arms to engage the collar flanges and hold the clutches in normal position.

3. In a variable speed transmission mechanism, a drive shaft, gears mounted for rotation thereon, a driven shaft, gears fast upon the driven shaft and engaging the gears upon the drive shaft, spring actuated clutches mounted upon the drive shaft for locking the gears thereto, a flanged collar carried by each clutch, dogs movable radially with respect to and engaging the flanges of the collars to hold the clutches in neutral position, electro magnets, a spring actuated armature for each magnet, means including a pivotally mounted lever connecting each of the armatures with one of the dogs, means whereby the magnets may be selectively energized to operate a dog and release a clutch to permit the latter to move to engaged position, means whereby the clutches may be returned to neutral position and means for preventing the release of a second clutch when one of said clutches is engaged.

In testimony whereof I affix my signature.

FRANK S. STRENG.